United States Patent [19]

Meyer

[11] Patent Number: 4,700,384
[45] Date of Patent: Oct. 13, 1987

[54] INDOOR TELEPHONE LINE DEMARCATION BOX HAVING SEVERAL COMPARTMENTS

[75] Inventor: Daniel Meyer, Hector, Minn.

[73] Assignee: Communications Systems, Inc., Hector, Minn.

[21] Appl. No.: 653,681

[22] Filed: Sep. 21, 1984

[51] Int. Cl.⁴ .................. H04M 1/00; H04R 1/06; H02G 3/10; H01R 9/00
[52] U.S. Cl. .................. 379/438; 174/60; 379/437; 379/419; 379/399; 439/892; 439/718
[58] Field of Search ............. 179/146 R, 178, 100 R, 179/100 C, 91 A, 179, 175.1 R, 175.3 R; 174/59, 60; 339/36, 198 J; 379/437, 438, 27, 399, 412, 419

[56] References Cited

U.S. PATENT DOCUMENTS

| 4,302,624 | 11/1981 | Newman | 339/36 |
| 4,369,340 | 1/1983 | Beatenbough | 379/454 |
| 4,411,485 | 10/1983 | Wiseheart et al. | 379/454 |
| 4,488,008 | 12/1984 | Dellinger | 379/412 |
| 4,560,839 | 12/1985 | Dillard | 379/399 |
| 4,647,725 | 3/1987 | Dellinger et al. | 379/399 |

OTHER PUBLICATIONS

Advertising Sheet, GI-100 Network Interface Module for Lippincott Industries, Inc., Bldg. S/3, Spokane Industrial Park, Spokane, WA 99216.
Advertisement for GL-100 and GL-200, The Network Interface Module, Lippincott Industries, Inc., Building S/3, Spokane Industrial Park, Spokane, WA 92216.
Product Evaluation Package for Siecor CAC 1000 Outdoor Network Interface, Siecor Corporation.
Siecor Technical News brochure, Package-Siecor CAC 1000 Outdoor Network Interface, for Siecor Corporation.
Advertising Sheet, Siecor Corporation, for Siecor CAC 1000.
Suttle Appartus Corporation Advertising Sheet, Model SE-104 for Demarcation or Whose Fault Is It?
Advertisement for The New TII-333 Universal Station Interface of Sales TII Industries, Inc.
Brochure called The SNI 9400 Modular Solution by Keptel, a subsidiary of Kessler-Ellis Products, Inc.

Primary Examiner—James L. Dwyer
Assistant Examiner—Danita R. Byrd
Attorney, Agent, or Firm—Kinney & Lange

[57] ABSTRACT

A telephone line demarcation unit separates the telephone company's property and wiring from those of the user and provides security for the telephone line connections and connectors. Compartments in the unit provide easy access for the user and further provides a selection of different types of connections or equipment that can be utilized. The telephone company terminals and test boards are separately compartmented so that the compartments can be separately sealed with seals to discourage tampering and provide evidence of tampering, and yet the user's portion of the interface box demarcation unit can be easily accessed for connecting a variety of telephone equipment.

8 Claims, 7 Drawing Figures

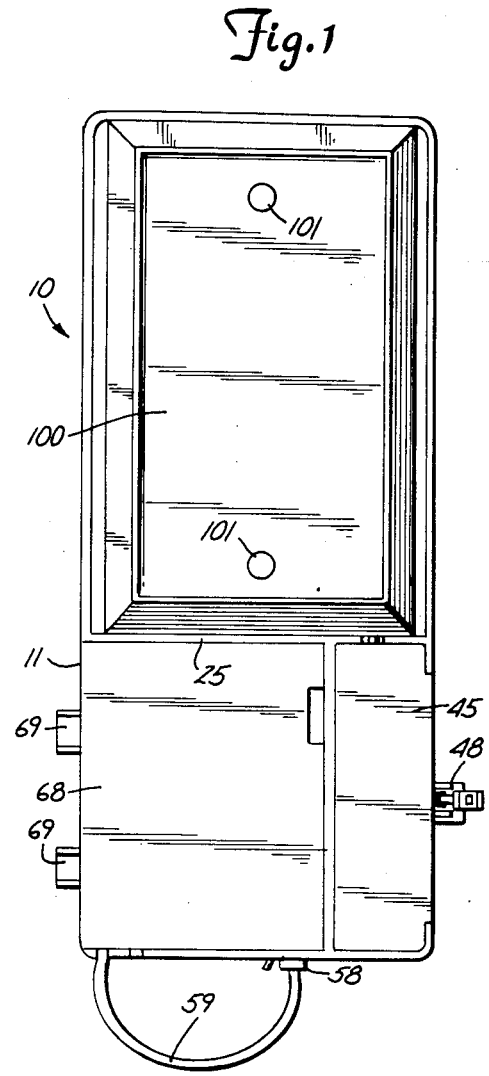
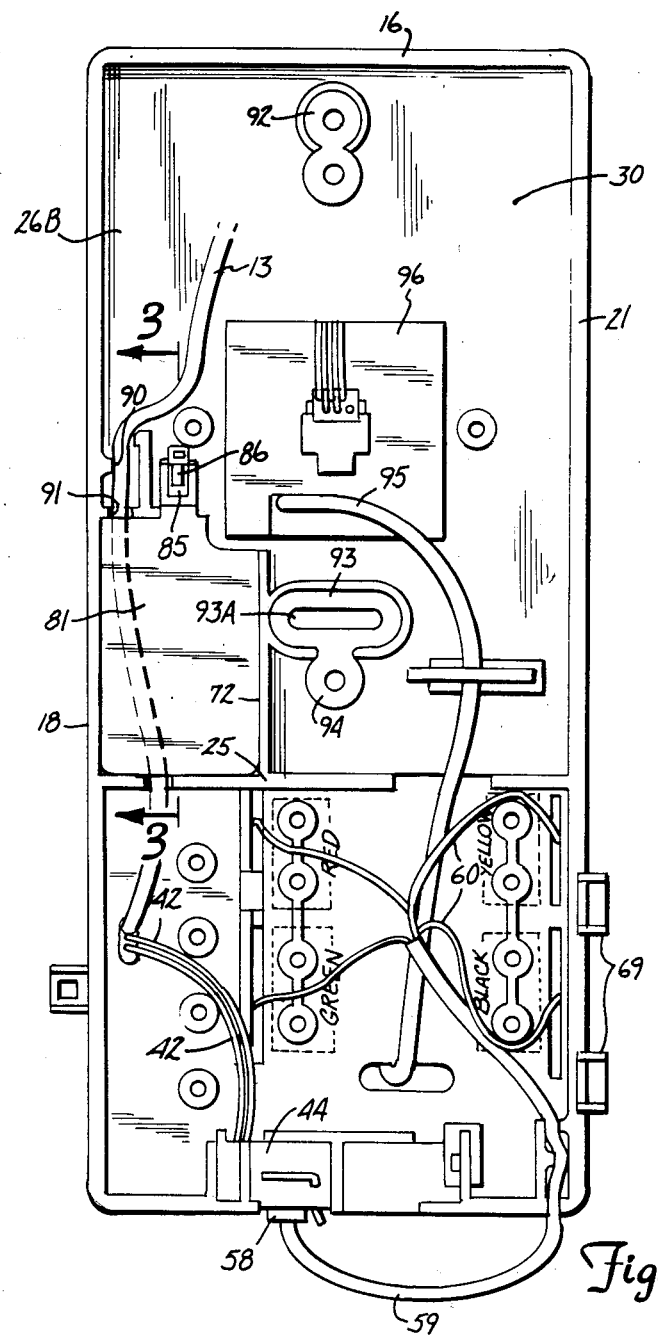
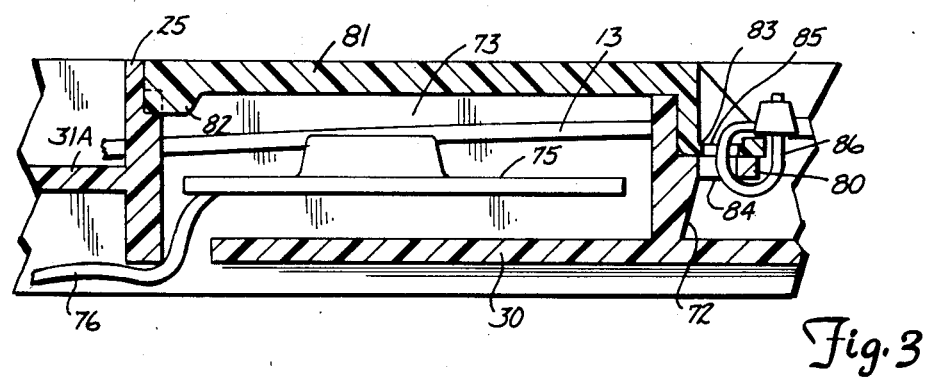

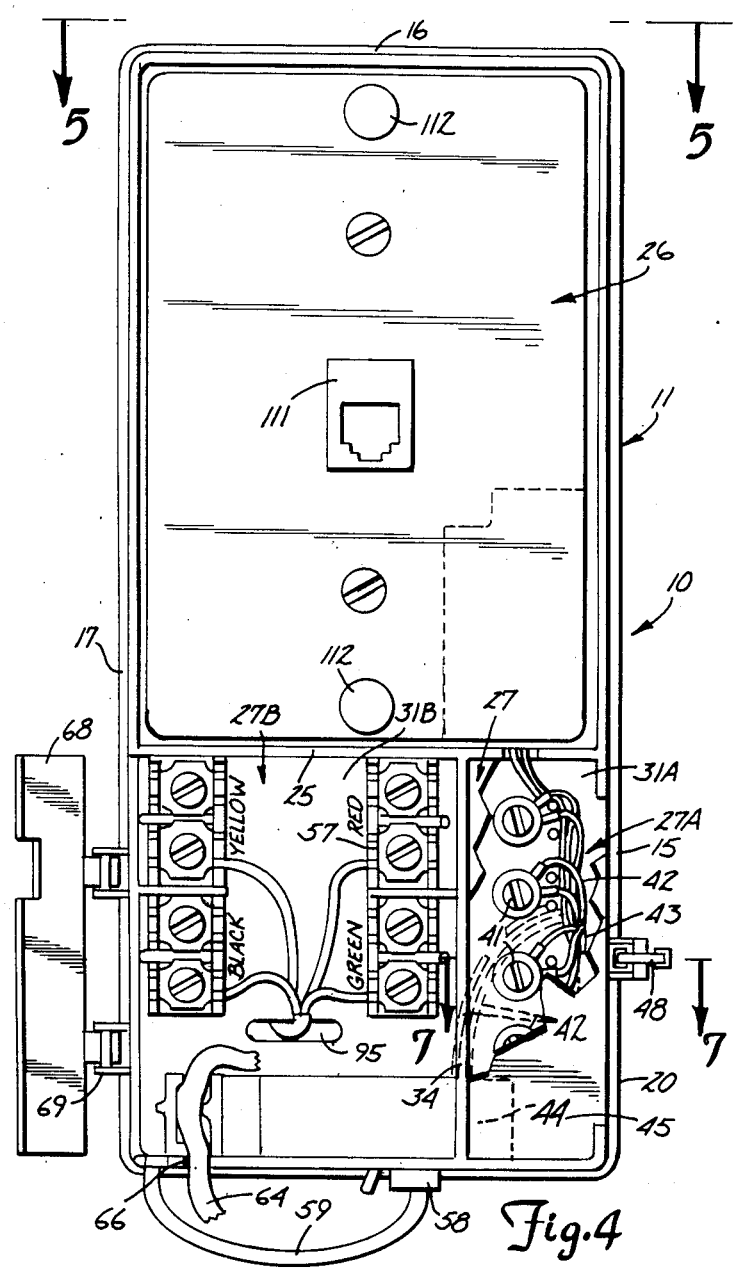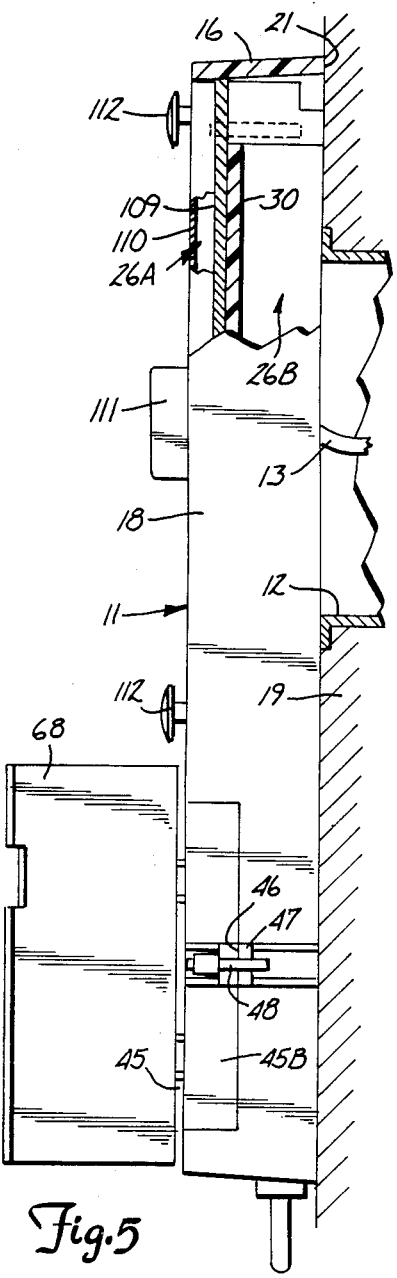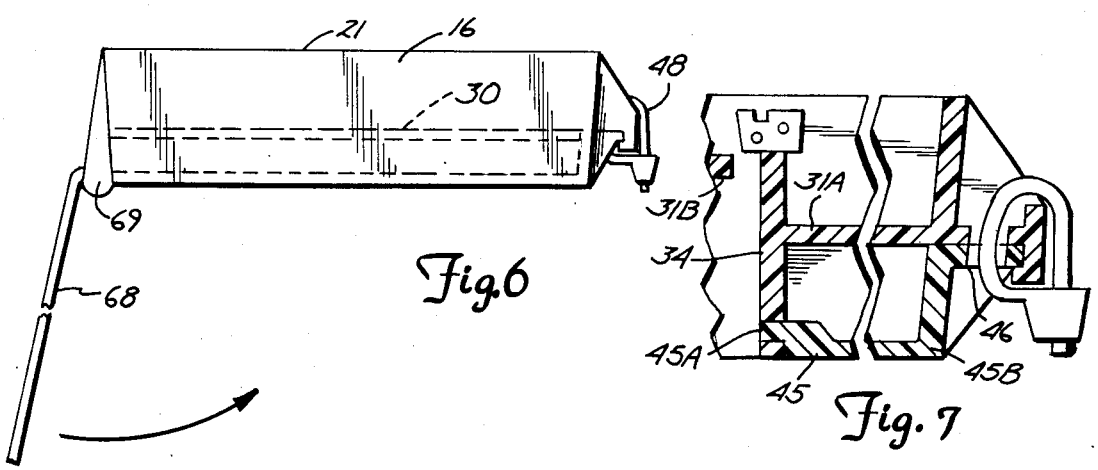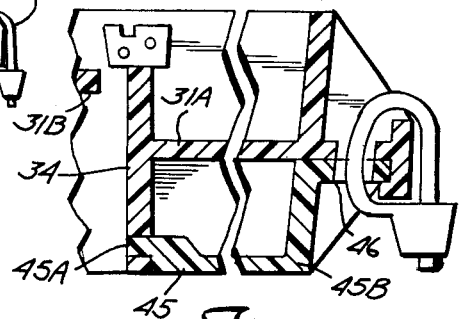
Fig. 4
Fig. 5
Fig. 6
Fig. 7

INDOOR TELEPHONE LINE DEMARCATION BOX HAVING SEVERAL COMPARTMENTS

BACKGROUND OF THE INVENTION

1. Field of the Invention.

The present invention relates to an indoor telephone line demarcation unit for permitting connection of telephone company (TELCO) equipment to user equipment with ease, and with security for the telephone conponents.

2. Description of the Prior Art.

Various outdoor demarcation units have been advanced in the art for use. For example, a typical outdoor network interface or termination unit is made and sold by Suttle Apparatus Corporation of Lawrenceville, Illinois, a subsidiary of the assignee of the present application. This provides a panel inside a housing with the TELCO equipment recessed below the panel. The panel can be secured in place, and screw-type connectors on the top of the panel are used for connecting in the various components. Additionally, network interfaces using modular jack assemblies have also sold by Suttle Apparatus Corporation for assembly of their Model SE625TD and SE742A junction boxes mounted in an outer housing or service box. These too may be exterior-type demarcation or network interface unit.

These units generally provide connection for testing of the interconnected systems to determine whether or not the equipment vendor for the indoor equipment is responsible for maintenance or repair, when a problem occurs, or if the problem that is occurring is in the TELCO or telephone company system.

Similar devices such as that described for the outdoor demarcation box have been advanced, but none provide for mounting in the interior of a room and utilizing the same box for not only housing the needed components and providing for connections to the indoor lines, but also providing a space for mounting auxiliary jacks or telephones.

SUMMARY OF THE INVENTION

The present invention relates to an indoor demarcation unit for housing the terminals for the telephone company incoming lines, and providing connectors for the indoor or user lines as well as access for mounting plugs or jacks as desired.

The housing mounts onto a wall outlet box, or directly to the wall and the telephone company incoming line is passed into the outlet box, and through suitable openings to a connecting block portion of the demarcation unit. A housing cover may be sealed to prevent access to the block portion. Any attempt to gain access to the telephone lines will be evidenced by damage, and only authorized persons can gain access to the telephone company connector block. Passageways for lines to connect test component printed circuit boards or other components from a circuit board that might be necessary for use with the telephone company equipment are provided. The small circuit boards normally provided are separately housed in another sealed and covered compartment on the interior of the interface body. The seals insure that only authorized persons can gain access to the circuit board without evidence of tampering. The TELCO equipment is then entirely separate from the user's lines.

A plurality of terminals are included on the incoming connecting block and separate wires run from the terminals to a modular jack which is mounted on the demarcation unit housing. This arrangement then permits a plug to be inserted into the jack to connect the incoming line to user accessed junction blocks used for connecting the user's telephones. The modular plug and jack can be disconnected for ease of individually checking the separate lines to determine if problems exist on the user's equipment or on the incoming telephone lines.

This feature is normal in demarcation units, but with the present device the plug and jack are held on an exterior surface of the housing, near the bottom and out of the way so that the testing can easily be done. The connections are nonobtrusive and there is no need for removing a cover for getting at this connection.

The user connector blocks, which are connected to the telephone lines through the modular jack and plug, are also covered by a separate cover for a smooth exterior appearance which can be merely held in place with a snap lock, and thus is easily accessible.

A portion of the housing, which mounts over the wall outlet box, has a separate portion for mounting telephone components which form a receptacle facing the interior of the room. The housing has provisions for placing a cover plate to cover the receptacle to provide a smooth exterior surface. The receptacle and mounting may be used for mounting a modular jack plate in place directly on the indoor demarcation unit. The jack can then be connected to the user connection terminals in the lower portion of the housing. The mounting also may be used for a modular wall jack that has mounting lugs to accept wall telephone sets so that the indoor demarcation unit can be used as a telephone support.

In this way the demarcation box assembly provides for security of the telephone company equipment, and includes means to to quickly disconnect the user's and TELCO lines through the use of the modular connector.

The unit is mounted in a compact package which has connections and compartments, so that it can be flush-mounted on a wall and yet provide access for the telephone company printed circuit test board in a compartment facing the mounting wall, out of view, and provide access to the terminals on the front for connection to the user's lines, as well as the ability to support modular jack plates and modular wall jacks.

BRIEF DESCRIPTION OF THE DRAWINGS

FIG. 1 is a front elevational view of a demarcation unit made according to the present invention;

FIG. 2 is a rear view of the device of FIG. 1;

FIG. 3 is a sectional view taken as on line 3—3 in FIG. 2, and rotated 90°;

FIG. 4 is a front elevational view of the device of FIG. 1 with a wall jack plate installed and with a front cover open, and with parts in section and parts broken away;

FIG. 5 is a side elevational view of the device of FIG. 4;

FIG. 6 is a top plan view taken as on line 6—6 in FIG. 4; and

FIG. 7 is a sectional view taken as on line 7—7 in FIG. 5.

DETAILED DESCRIPTION OF THE PREFERRED EMBODIMENTS

A network interface assembly indicated generally at 10 in the first form of the invention has a housing 11 that is adapted to be mounted onto the front connectors of a conventional outlet or connector box 12 mounted in a building interior wall. The connector box 12 is conveniently used for receiving an incoming cable 13, which is the telephone company incoming service cable.

Housing 11, forming the demarcation unit and network interface, comprises perimeter walls, including end walls 16 and first and second longitudinally extending side walls 17 and 18, respectively. The end walls 16 join the side walls to form an enclosure.

The perimeter walls 15 have front and rear edge surfaces that define two parallel spaced planes. These edge surfaces are indicated at 20 (FIG. 4) and 21 (the front of FIG. 2). The parallel spaced planes formed by the edge surfaces define the housing enclosure. The plane defined by the rear edge surfaces 21 is enclosed by the building wall 19 on which the demaracaton unit is mounted when it is attached to the outlet box 12, and thus the edge surfaces 21 rest against the wall 19 of the interior of the house.

The housing 11 is divided into various compartments. A first cross-wall 25, which is a little over one-third of the way up from the bottom end wall 16 divides the housing into a user area 26 and a line connection are 27. In addition, there is a base, generally transverse dividing wall 30 which divides the area 26 into front and rear chambers 26A and 26B (se FIG. 5). Wall 30 extends generally parallel to the planes of the surfaces 20 and 21, and is located from the plane defined by the edges 21 at a first distance.

The area 27 is divided into two front chambers 27A and 27B (FIG. 4) and two wall sections 31A and 31B parallel to wall 30 form the bases for the chambers 27A and 27B. Wall sections 31A and 31B are both spaced from the plane defined by the edge surfaces 20 a greater distance than the wall 30 to provide more depth to the compartments formed.

Chamber 27A is used for housing the primary telephone company line connection terminals. A dividing wall 34, which is parallel to the side walls 17 and 18, extends between one end wall 16 and the cross-wall 25 to separate the chambers 27A and 27B. The primary connection chamber 27A has a plurality of terminals 41 therein. The terminals 41 are provided for receiving the individual wires or lines from cable 13. Cable 13 has 2, 3 or 4 individual wires, as is common. The cable 13 is passed through a provided opening 43 in the wall 31A to chamber 27A. The terminals 41 form the user-TELCO interface connectors, and separate wires indicated generally at 42 are connected to terminals 41 and also pass through opening 43. The wires 42 connect to the connectors of a modular jack 44, that is mounted on the lower end wall 16 of the housing 11 and opens through the lower end wall 16. The jack 44 can be seen in FIG. 2. Modular jack 44 is used for permitting disconnection of the telephone company incoming cable 13 for testing (as will be more fully explained).

The chamber 27A is a chamber which is not to be entered by the user, or persons servicing the user equipment. Thus a cover indicated at 45 is suitably mounted with small tabs 45A (FIG. 7) extending through openings in wall 34. At the outer edge along the outer wall 18, the cover 45 has a downwardly extending lip 45B and a latch plate indicated generally at 46, which mates with a corresponding upwardly extending latch plate support 47 on the wall 18. A suitable seal cable 48 is passed through apertures in the latch plate 46 and support 47 to seal the cover 45 and prevent it from being opened without indicating tampering.

Once the connection has been made with wires 42 to the modular connector 44 and the cover 45 is put into place, the user cannot gain access to connectors for the telephone company cable 13, and thus this forms the demarcation chamber for connection between TELCO and user equipment.

Chamber 27B defined by the wall 34 and the side wall 17 includes connector terminals on terminal blocks 57 to permit a user to connect one to four lines to telephone equipment in the dwelling unit. Terminal blocks 57 have suitable screw connectors for connecting the user's telephone lines and as shown are labeled for line color. To provide connections for the telephone company line, a modular plug 58 is provided with a cable 59 that has individual conductors or wires, indicated generally at 60, connected to the appropriate terminals of the terminal blocks 57. Modular plug 58 can be plugged into the modular jack 44 for connecting the terminals on terminal blocks 57, therefore, to the telephone company conductors in cable 13.

The compartment 27B has sufficient clearance from the plane defined by the edge surfaces 20 so that the terminal screws on blocks 57 can be used for connecting in the desired lines such as the service cable shown at 64 that goes through a strain relief notch or guide 65, and through an opening 66 to the exterior of the housing 11. This then can lead to any desired location. A cover 68 is hingedly attached as at 69 to side wall 17 and can be closed to cover the chamber 31B, as shown in FIG. 1. The cover 68 may snap lock into place in that it is used for accessing only the user's connection terminals.

Another feature of the present invention is that the housing 11 has space for supporting modular jack plates or modular wall jacks in the area 26.

The wall 30 is spaced from the plane of the edge surfaces 21 to provide adequate space at the backside of wall 30 for mounting posts and components. As seen in FIGS. 2 and 3 a separate compartment is defined within chamber 26B by walls 72. The walls 72 define a chamber 73 in which a circuit board 75 or similar component is housed. Circuit board 75 has leads 76 from the circuit components extending into the TELCO terminal compartment 27A. Board 75 is used for mounting suitable components desired, for example, telephone test equipment. Leads 76 pass through provided openings to be connected to suitable ones of the terminal screws 41 on the interior of the chamber 27A, which is sealed from the user. Walls 72 include an end wall having a latch lug 80 mounted thereon (see FIG. 3). A cover 81 has a tab 82 which guides the positioning of the cover 81. The cover also has an offset latch plate 83, which mates with latch member 80. Apertures 84 and 85 in latch member 80, and latch plate 83 align when cover 81 is in place covering the chamber 73, and a seal cable 86 can be passed through the apertures for securing the cover 81 in position. Cover member 81 then cannot be removed to gain access to circuit board 75 without tampering with the seal. This provides, again, further security in a separate location for the telephone company components such as circuit board 75. A strain relief 90 is provided adjacent an aperture 91 leading into the chamber 73, to hold line 13 that passes through this chamber.

A standoff post indicated at 92 is provided near the upper end wall 16 on the interior of the chamber 26B, and it has apertures therethrough for holding screws for mounting the housing 11 to the box 12, and also for providing screw openings that may be threaded for mounting outer cover plates and jack plate support frames. A standoff member 93 is provided near dividing wall 25, as shown, along with standoff sleeve 94. Standoff member 93 defines a slot 93A for alignment purposes for screws that will go into outlet box 12, and sleeve 94 provides a opening for receiving screws for mounting cover plates. Wall 30 has a center opening 96 through which wiring can be accessed, such as the connection cable shown at 95. If no jack plate or wall jack is mounted on the housing 11, a cover plate indicated at 100 (FIG. 1) can be installed by placing it over the opening to the chamber 26A within the boundary walls of the housing. This can be held in place with suitable push in plastic pins indicated at 101 in FIG. 1, and merely left in place for decorative appearances. A very unobtrusive housing is provided which will serve as a termination unit for the telephone company equipment, and as an interface for the user's equipment.

If a wall telephone is to be mounted at the housing 11, the cover 100 is removed and a modular jack wall plate indicated at 110 in FIG. 2 of conventional design is mounted over chamber 26A. A modular jack 111 will receive a plug-in telephone. A conventional backing frame shown fragmentarily at 109 in FIG. 5 is supported on the side of wall 30, and the cover plate is held in the support frame in a conventional manner. Mounting posts 112 for supporting a telephone are thus accessible on housing 11. The jack 111 is connected to cable 95.

If desired, a modular jack assembly can be mounted on the housing 111 without the telephone support posts, and connected to the cable 95, or to other suitable cables as desired. Modular jacks are conventional units which can be surface mounted to the stand off posts 92 and 94.

Thus, the housing provides individual sections that are in one complete enclosure, and provides for two compartments that can be sealed from the homeowner by suitable seals for telephone company wiring and a compartment containing terminals for user connection. The unit is compact, and provides for separating out the telephone company terminals and from the homeowner's equipment by merely unplugging the plug 58 from the jack 44, and provides easy access to the terminals for connecting in the homeowner's equipment, as well as for mounting wall jacks or jack assemblies for use directly on the demarcation unit.

What is claimed is:

1. An indoor demarcation box for telephone line use comprising a housing, first wall means defining a perimeter of the housing, second wall means for forming at least first and second separate compartments within the perimeter defined by the first wall means, a first of said compartments including terminals for connection to a telephone company telephone service line, a first cover covering said first compartment and accessible from the exterior of the housing and having means to permit sealing the cover to prevent access thereto without damage to the seal, and a second of said compartments having a second cover mounted thereon on the exterior of the housing easily openable by the user, and containing terminals for user connections accessible from the same side of said housing as the first cover, a portion of said first and second wall means further defining a separate third section for mounting a wall jack assembly therein, third wall means within the perimeter defined by the first wall means defining a third compartment, a third cover on the third compartment opening to an opposite side of the housing from the covers for the first and second compartments, means for sealing the third cover covering the third compartment, said third compartment comprising a housing for a printed circuit board, and passage means defined between said third compartment and said first compartment for passage of leads from the printed circuit board in the third compartment to the terminals for the incoming telephone service line.

2. The box as specified in claim 1 wherein said second compartment comprises a pair of spaced apart terminal blocks, each of said terminal blocks having a plurality of line connection terminals thereon.

3. An indoor demarcation box for telephone line use comprising a housing, first wall means defining a perimeter of the housing, second wall means for forming at least two separate compartments within the perimeter defined by the first wall means, a first of said compartments including terminals for connection to incoming telephone company lines, a first cover covering said first compartment and accessible from the exterior of the housing and having means to permit sealing the cover to prevent access without damage to the seal, and a second of said compartments having a second easily openable separate cover mounted thereon on the exterior of the housing by the user, and said second compartment containing terminals for user connections accessible from the same side of said housing as the first cover, said first and second wall means further defining a separate third section for mounting a wall jack assembly, a second modular communication jack supported by the housing and connected to the terminals in the first compartment, and a plug connected to the terminals in the second compartment, said jack and plug being accessible from the exterior of said housing, third wall means within the housing defining a third compartment, a third cover on the third compartment, said cover of said third compartment opening to an opposite side of the housing from the covers of the first and second compartments, and means to permit sealing the third cover covering the third compartment to prevent access to the third compartment without damage to the seal.

4. The box as specified in claim 3, said housing having means for attaching said housing to an outlet box mounted on a wall.

5. An indoor demarcation box for telephone line use comprising a housing, first wall means defining a generally rectangular shaped perimeter of the housing having first and second end portions and defining a plane which is generally perpendicular to the first wall means, second wall means for forming first and second side by side compartments within the perimeter defined by the first wall means and located at the first end portion of said housing, and forming a third section within the housing extending from the first and second compartments to the second end portion of the housing, said first compartment including terminals for connection to incoming telephone company lines, a first cover covering said first compartment and accessible from the exterior of the housing and having means to permit sealing the cover to prevent removal without damage to a seal used therewith, said second compartment having a second separate cover mounted thereon on the exterior of the housing easily openable by the user, and containing terminals for user connections accessible from the same side of said housing as the first cover, and a dividing wall generally parallel to the plane of the housing dividing said third section into third and fourth compartments within the perimeter defined by the first wall means, the third compartment comprising means for mounting a wall jack assembly on the same side of the housing as the first cover and the fourth compartment opening to an opposite side of the housing from the first cover.

6. The box as specified in claim 5, including means for mounting said housing on a wall with the fourth compartment opening facing toward the wall.

7. A kit comprising a demarcation housing having first and second compartments, said first compartment having a first cover member to enclose said first compartment, means for sealing said first cover member to prevent undetected tampering, said first compartment comprising first terminals for connection to a telephone company service line, a second cover for said second compartment accessible from a first side of said housing, said second cover being openable for access to the interior of the second compartment and being closable to cover the second compartment, said second compartment including second terminals for connection to telephone lines of the user, a jack and plug assembly accessible from the exterior of said housing, to permit connecting and disconnecting the telephone company service line, said housing having a section separate from the first and second compartments, and a wall jack plate having a second jack thereon mounted on said housing overlying said separate section, the second jack being accessible from the first side of the housing, and a dummy cover plate for alternately mounting overlying said separate section to cover the separate section of the housing when the wall plate is not in use.

8. The kit of claim 7 wherein said wall jack plate includes means for supporting a telephone on the jack plate and demarcation housing.

* * * * *